US005426145A

United States Patent [19]

Ponce et al.

[11] Patent Number: 5,426,145

[45] Date of Patent: Jun. 20, 1995

[54] TRACKING-RESISTANT ELECTRICAL INSULATORS CONTAINING SILICA AND ALUMINA FILLER IN A POLYESTER RESIN MATRIX

[76] Inventors: Marco A. Ponce, Sirio No. 2, col. Lomas de Palmira, Cuernavaca, Mor.; Jaime G. Cardosi, Prolongacion del Nino No. 16, Yautepec, Mor.; David Ponce, Humboldt No. 206-3, Cuernavaca, Mor., all of Mexico

[21] Appl. No.: 127,089

[22] Filed: Sep. 27, 1993

Related U.S. Application Data

[63] Continuation of Ser. No. 956,045, Oct. 2, 1992, abandoned, which is a continuation-in-part of Ser. No. 646,444, Jan. 25, 1991, abandoned, which is a continuation of Ser. No. 269,355, Nov. 10, 1988, abandoned.

[51] Int. Cl.[6] .......................... C08J 3/20; C08K 3/18; C08K 3/22; C08L 67/06

[52] U.S. Cl. .................................... 524/430; 523/220; 523/513; 523/514; 523/521; 524/437; 524/493

[58] Field of Search ............... 523/220, 513, 514, 521; 524/493, 430, 437

[56] References Cited

U.S. PATENT DOCUMENTS

| | | | |
|---|---|---|---|
| 3,956,230 | 5/1976 | Gaylord | 260/42.14 |
| 4,001,128 | 1/1977 | Penneck | 252/63.2 |
| 4,210,774 | 7/1980 | Perry | 174/140 R |
| 4,311,738 | 1/1982 | Chi | 427/387 |
| 4,766,163 | 8/1988 | Strudwick | 523/509 |

FOREIGN PATENT DOCUMENTS

| | | |
|---|---|---|
| 2209147 | 3/1986 | Japan . |
| 2271708 | 5/1986 | Japan . |
| 3317540 | 6/1987 | Japan . |
| 0709125 | 5/1954 | United Kingdom . |

*Primary Examiner*—Paul R. Michl
*Assistant Examiner*—U. K. Rajguru
*Attorney, Agent, or Firm*—Rothwell, Figg, Ernst & Kurz

[57] ABSTRACT

Electrical insulators having a high tracking resistance are obtained from a highly filled polymerizable composition, by injection molding said composition within a short period of time as low as 5 minutes, said composition containing an amount of up to 96% by weight of an improved filler which comprises, based on the total composition, from about 40 to about 52% by weight of silica sand having a particle size such that no less than about 70% by weight of the particles are retained on a 60 mesh U.S. standard sieve and no more than about 30% by weight of the particles are retained on a 40 mesh U.S. standard sieve, an amount of from about 23 to about 36% by weight of silica sand having a particle size such that no less than about 80% by weight of the particles are retained on a 325 mesh U.S. standard sieve and no more than about 11% by weight of the particles are retained on a 200 mesh U.S. standard sieve, and a smaller proportion of finely comminuted alumina; and the remainder of the composition comprising a relatively high viscosity unsaturated polyester resin precursor incorporated in said filler. Fibrous materials may be added to the filler for increases strength and dimensional stability.

10 Claims, 8 Drawing Sheets

TRACKING-RESISTANT ELECTRICAL INSULATORS CONTAINING SILICA AND ALUMINA FILLER IN A POLYESTER RESIN MATRIX

This application is a continuation of Ser. No, 07/956,045, filed Oct. 2, 1992, now abandoned, which is a continuation-in-part of Ser. No. 07/646,444, filed Jan. 25, 1991, now abandoned, which is a continuation of Ser. No. 07/269,355, filed Nov. 10, 1988, now abandoned.

FIELD OF THE INVENTION

The present invention refers to tracking resistant electrical insulators, to a highly filled polymeric molding composition for the manufacture thereof, as well as to a method for the preparation of said composition and for the manufacture of said electrical insulators.

BACKGROUND OF THE INVENTION

As is well known in the art, electrical insulators for high voltage lines are usually manufactured from porcelain materials which, although having excellent dielectric properties, show a great number of disadvantages, inasmuch as porcelain materials are highly brittle and are subject to fracture into dangerous sharp flying pieces, are difficult to form in close tolerances, require expensive equipment for the processing thereof, as well as high temperature furnaces for curing the pieces molded therefrom, and are unsuitable for encapsulating or for attaching metal members thereto.

The disadvantages shown by porcelain-type electrical insulators were overcome by the advent of electrical insulators manufactured from heavily filled polymeric materials, particularly polyesters and epoxy resins which contain fillers of hydrated alumina particles for providing carbon tracking resistance due to arcing at high voltage, as well as other types of particulate fillers in amounts up to about 70% by weight, such as described in U.S. Pat. No. 4,001,128, which teaches the addition of fillers formed by hydrated alumina, and suggests that the water of hydration of the alumina evaporates to produce a porosity which is reduced, in accordance with said patent, by means of the addition of a minor proportion of silica sand, preferably treated with an adhesive such as silane-type adhesive. The grains of the alumina and silica in accordance with the above patent, for use in manufacture of heavily filled resin compositions for use in the manufacture of electrical insulators, must be very fine and is has been shown that these finely powdered filler materials do not permit the addition of sufficiently high proportions of the filler into the resin or plastics material, whereby it was believed that the amount of inert filler could not be increased to a significantly higher level than the above mentioned 70%, without at the same time degrading the quality of the product, particularly in connection with its mechanical strength and resistance to tracking and the like. The insulators manufactured from this type of filled plastics materials, therefore, never gained reasonable acceptance in the market.

In order to overcome the above mentioned drawbacks shown by the porcelain insulators and by the filled resin insulators, Perry, Elijah R., in U.S. Pat. No. 4,210,774, patented Jul. 1, 1980, teaches the manner of providing a heavily filled polymeric composition having suitable properties for being used in the manufacture of electrical insulators, and including up to 97% of the non conductive inorganic inert non-porous filler particles, preferably constituted by silica which may contain smaller proportions of alumina and preferably pretreated with a silane adhesive, to thereafter be incorporated into a polyester methacrylate resin in order to form a slurry which may be molded and cured in order to form an electrical insulator.

However, the manner of forming a composition having such high loading, in accordance with Perry, was possible only through the use of appropriate resin precursors which are sufficiently flowable at such high loadings and also more importantly, by grading the filler particles to provide a low void space.

More particularly, Perry describes a composition in which at least four different grades of filler material to maximize loading had to be used, in order to minimize the seize of the voids, and completing the admixture by adding a monomer comprising methyl methacrylate or other polyesters which must have a viscosity less than 150 cps at room temperature, preferably from 1 to 50 cps, in order to obtain an adequate flowability of the resin precursor so that the same may completely fill the voids between the particles of the filler material.

More particularly, Perry describes a composition for the filler material which comprises a mix of relatively coarse silica particles, constituted by a major portion passing a No. 20 but not a No. 40 mesh sieve, admixed with intermediate size particles only a minor portion of which will be retained on a No. 40 mesh sieve screen, and with finer particles 98% of which pass a No. 60 mesh sieve screen but not a 400 mesh sieve screen and still much finer particles of the size of for instance, silica flour, the major portion of which passes a 400 mesh sieve screen.

By the above means, Perry obtained a very low void space in the mixed filler material, but also a plurality of very narrow channels through which the flowable monomer had to pass, hence the necessity of using a low viscosity monomer or polymer precursor, the viscosity of which must be below 150 centipoises and preferably from 1 to 50 cps or less.

The addition of the resin material to this filler, with very low proportions of resin as compared to the proportions of filler, was preferably effected in accordance with Perry, by the treatment of the filler with an adhesive material such as those described and claimed by Gaylor (U.S. Pat. No. 3,956,230 patented May 11, 1976) or by Chi (U.S. Pat. No. 4,311,138 patented Jan. 19, 1982), that are either maleic anhydride-type or silane-type adhesives which provide for the adhesion of the resins to the particles of the filler material in an effective manner such as is clearly shown by either Gaylor or Chi.

Although the heavily loaded polymeric materials of Perry have been considered up to the present date to show excellent properties for being used in the manufacture of electrical insulators, the said material devised by Perry shows the important drawbacks that the procedure for homogeneously admixing the four different grades of silica sand for the filer material is extremely difficult to be effected in order to accomplish a true homogenization of the different particles at the same time preventing stratification thereof, whereby this procedure takes a long time and strict control must be exercised on said procedure in order to obtain a homogeneous mixture of the four different grades of silica sand material for also providing a homogeneous polymeric mixture that may be used for molding and curing in order to produce electrical insulators having uniform properties against tracking by arcing, said against mechanical fractures or high temperature cracks that are common in non-homogeneous materials.

On the other hand, the necessity of providing a very low viscosity polymer precursor in order to secure the filling of the voids between the particles of the filler material, generates the necessity of using unpolymerized or only partially polymerized monomers which thereafter take an extremely long time for being cured, whereby the process of molding and curing the composition for the manufacture of electrical insulators is extremely slow, with the consequent increases in the costs of production of said electrical insulators.

Therefore, all the ceramic or porcelain compositions, as well as all the filled polymeric compositions extant in the prior art for the manufacture of electrical insulators left much to desire, whereby for long time it has been sought to produce a composition which is not so difficult to be compounded and the quality of which is not so difficult to preserve, and that may still contain an extremely high proportion of inert organic filler and a low proportion of the polymeric materials, in order to have excellent electrical insulation properties not lower than those shown by the composition of Perry, without any satisfactory results up to the present time.

OBJECTS OF THE INVENTION

Having in mind the defects of the prior art compositions for the manufacture of electrical insulators, it is an object of the present invention to provide a highly filled polymeric composition which will not require the use of many different grades of particles in the filler material and which will not require the addition of polymer precursors of an extremely low viscosity for forming the molding composition.

It is another object of the present invention to provide an electrical insulator having a high tracking resistance, which will show excellent electrical insulation properties and high mechanical strength, through the use of a heavily filled polymeric composition containing highly simplified filler materials therein.

It is another and more particular object of the present invention to provide a polymeric composition of the above described character, which will require extremely short periods of curation to form an electrical insulator without thereby losing electrically insulating properties and mechanical strength.

Another object of the present invention is to provide a process for molding a polymeric composition of the above described character, which will be of economical and simple operation and will produce insulators having excellent electrical and mechanical properties.

Another object of the present invention is to provide a highly simplified injection molding machine for carrying out the process mentioned above.

SUMMARY OF THE INVENTION

The foregoing objects and others ancillary thereto are preferably accomplished as follows:

According to a preferred embodiment of the present invention, a polymeric composition suitable for being used in the molding of electrical insulators comprises an amount of from about 76 to about 96% by weight of a filler which is a mixture of only two different types of sands, thoroughly admixed in order to form a fully homogeneous mixture, and comprising an amount of from about 40 to about 52% of silica sand having a particle size such that no less than about 70% by weight of the particles are retained on a 60 mesh U.S. standard sieve and no more than about 30% by weight of the particles are retained on a 40 mesh U.S. standard sieve, an amount of from about 23 to about 36% by weight of silica sand having a particle size such that no less than about 80% by weight of the particles are retained on a 325 mesh U.S. standard sieve and no more than about 11% by weight of the particles are retained on a 200 mesh U.S. standard sieve, and from about 3 to about 8% by weight of finely comminuted alumina, with which sufficiently large voids and channels are left between the particles of the filler material, to provide for the inclusion, within the voids between the particles of said filler material, of a moderate to high viscosity monomer or partially polymerized monomer formed by an amount of from about 4 to about 18% by weight of a phthalate unsaturated polyester resin precursor, particularly a commercial type of polyester resin precursor having a content of from 25 to 50% by weight of styrene, and also containing from about 0.1 to about 0.7% of 50% benzoyl peroxide, from about 0.05 to about 0.5% by weight of an organosilane as an adhesive to bond the resin to the particles of the filler material, the trimethoxysilane and methacryloxypropyl-trimethoxysilane being preferred organosilanes to be used as adhesives for the polymeric composition, and from about 0.01 to 0.2% by weight of a silicon oil plasticizer material, as well as from about 0.5 to about 1.5% of a stearate such as calcium or zinc stearate, also as a plasticizer material and from about 0.01 to about 0.1% by weight of a phenolic type antioxidant such as ter-butylhydroxytoluene.

To the above composition, an amount of from 1.5 to about 3% by weight of fiber glass material may be added for increasing mechanical strength and dimensional stability, although the composition containing the fibrous material may be regarded as not being suitable for outdoor use, because the tracking resistance is reduced to a certain extent in favor of the dimensional stability.

The process of preparing the above composition comprises firstly introducing in a suitable mixer, at a temperature of from about 20° to about 30° C., the organic compounds in the following order: firstly the stearate followed by the antioxidant and by the silicon oil are introduced in the mixer, to thereafter add the organosilane, the benzoyl peroxide curing material and finally the polyester resin precursor.

The thus obtained heterogeneous mixture is homogenized during a period of time of from about 3 to about 4 minutes, in order to obtain a highly homogenized mixture. The silica sands of the two different grades and the alumina are separately preheated to a temperature higher than about 55° C., such as 55° to 60° C.; and are thereafter admixed in a helical Baker Perkins mixer or the like, until the temperature of the sands decreases to the level of 55° C. At this time, the previously prepared mixture of organic ingredients is poured on the sands, taking care that the total of the organic compounds is poured during a period of time of not more than 60 seconds, and the mixture is continuously stirred for about 10 minutes at a temperature of from 55° to 60° C. The mixture obtained may be stored for long times without any decrease in its mechanical and electrical properties, which is a great advantage of this composition over the previously extant compositions in the art.

The insulators are injection molded from said composition by preheating the composition to a temperature of from about 25° to about 60° C. and molding the same in a suitable mold maintained at a temperature of from about 110° to about 130° C. and applying a pressure of from about 56 to about 145 kg/cm$^2$, for a period of from about 12 to about 30 minutes.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments when read in connection with the accompanying drawings, in which:

DETAILED DESCRIPTION

Figure 1:
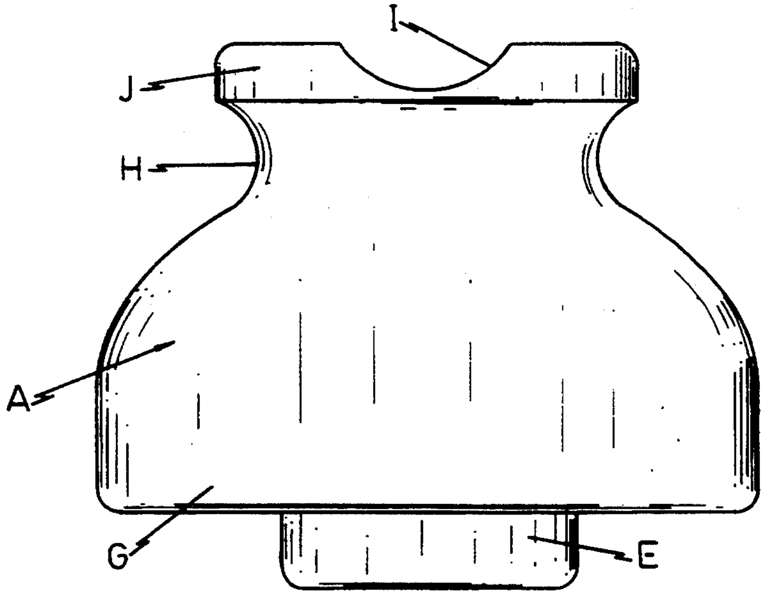
FIG. 1 is an elevational view of an insulator manufactured in accordance with the present invention for outdoor use.

Contrary to the teachings of the prior art, in which polymer compositions with a heavy load were possible only by the provision of a filler comprising at least four different grades of particle sizes, so that the smaller particles could fill the voids left by the larger particles, it has now been discovered that, without sacrificing a meaningful percentage of the capacity of loading of the composition, it is possible to provide fillers having only two different grades of particle sizes, and without the necessity of using monomers having a relatively low viscosity to permit the fluid to enter into all of the voids left in the filler, and which permit instead the use of either monomers or partially polymerized monomers having much higher viscosities, without any problem in accomplishing the task of filling all the voids between the particles of the filler with the said monomer or partially polymerized monomer, in order to obtain a highly homogeneous heavily loaded polymer composition suitable for the manufacture of electrical insulators.

Although the exact reasons why the omission of two grades of particle sizes in the filler still permits the heavy loading of the composition are not well understood, it is believed that the compositions of the prior art, which provide a filler comprised of four different grades of filler particles, namely, relatively coarse particles accompanied by a proportion of an intermediate size particles plus a proportion of fine particles and a proportion of extremely fine particles, did not permit the incorporation of a relatively viscous fluid, because very probably the extremely fine particles of filler provided in the composition, tended to agglomerate and therefore clog the voids between the larger particles of the filler, whereby the distribution of the monomer fluid was not absolutely uniform and some air gaps were left within the filler, despite the fact that the amount of filler was admittedly as high as about 98% by weight. In the composition of the present invention, a filler containing main proportions of only coarse particles and fine particles is provided, by means of which the voids left between the coarse particles are partially filled with the fine particles of said filler, and said fine particles do not tend to agglomerate and clog the voids between the larger particles of filler, whereby the incorporation of a relatively viscous fluid such as a monomer or a partially polymerized monomer is extremely uniform, thus permitting the incorporation of heavy loadings in the compositions as high as about 96% by weight instead of the 98% admitted as being possible with the rather complex filler particles of the prior art.

On the other hand, by avoiding the provision of extremely fine particles of filler, the surface area of the filler particles is considerably reduced, thus requiring correspondingly less amounts of polymeric binder such as the organosilanes, nevertheless obtaining a highly uniform composition with the polymer very efficiently bonded to the particles through the silane bonding agent, which is used in lower amounts.

All of the above considerably reduces the cost of manufacture of the insulators from the composition of the present invention as compared with the cost obtained by using the prior art compositions, and therefore the said composition is considered to represent a meaningful advance in the art.

The composition of the present invention, when appropriately cured, may be used as a substitute for porcelain in the manufacture of electrical insulators, as well as it may be used with advantages for the manufacture of said electrical insulators over the heavily filled polymeric compositions of the prior art. The product obtained from the composition of the present invention results in a non-brittle material which facilitates the curing thereof, without generating inner stresses causing cracking of the finished products. The composition of this invention, on the other hand, is also highly suitable for encapsulating metal pieces or for receiving metal pieces embedded therein, such as the metal pieces that are normally used in porcelain insulators, but without the need of using adhesives for fastening said metal inserts and thus avoiding the absorption of moisture and the premature aging of the insulator.

The highly filled polymeric material of the present invention has high strength to thermal shock and consequently prevents cracking of the finished products such as the insulators mentioned above, and has superior mechanical properties to either porcelain or to the prior art polymeric compositions that have been commonly used for the manufacture of electrical insulators for high voltage outdoor use.

The dielectric composition of the present invention essentially comprises an amount of from about 40 to about 52% by weight of silica sand having a particle size such that no less than about 70% by weight of the particles are retained on a 60 mesh U.S. standard sieve and no more than about 30% by weight of the particles are retained on a 40 mesh U.S. standard sieve; an amount of from about 23 to about 36% by weight of silica sand having a particle size such that no less than about 80% by weight of the particles are retained on a 325 mesh U.S. standard sieve and no more than about 11% by weight of the particles are retained on a 200 mesh U.S. standard sieve; from about 3% to about 8% by weight of finely comminuted alumina, preferably trihydrated alumina, which in admixture from the filler of the present invention; and as a polymeric material to form a matrix for said filler, the composition of the present invention comprises from about 4 to about 24% by weight of an ortho- or iso-phthalic unsaturated polyester resin precursor, particularly a commercial type polyester resin monomer having a content of from 25 to 50% by weight of styrene; from about 0.1 to about 0.7% by weight of 50% benzoyl peroxide as a curing agent; from about 0.05 to about 0.5% by weight of an organosilane such as a trimethoxysilane or methacryloxy-propyl-trimethoxysilane as a bonding agent to secure a suitable bond between the resin material and the surface of the particles of the filler, from about 0.01 to about 0.2% by weight of a silicone oil as a lubricating and plasticizer material, from about 0.5 to about 1.5% by weight of a stearate such as calcium or zinc stearate, also as a lubricating and plasticizer material, and from about 0.01 to about 0.1% by weight of a phenolic type antioxidant such as terbutylhydroxytoluene.

The above described composition of matter is highly suitable for the manufacture, through adequate molding operations, of electrical insulators for outdoor use, because the resulting product has a high tracking resistance, both in the moist and dry state, and therefore is highly suitable for said outdoor use.

However, a slightly more economical composition may be provided in accordance with a second embodiment of the present invention, which has an increased dimensional stability and mechanical strength, although a reduced tracking resistance, but which is highly suitable for being used in the manufacture of insulators, through suitable molding operations, for indoor use wherein the tracking resistance in the moist state is not very important.

In accordance with this second embodiment of the present invention, a small proportion of a fibrous inorganic material such as fiber glass is added to the composition, together with a small proportion of titanium dioxide for coloring the finished product, which is important for indoor use. Preferably an amount of from about 1.5 to about 3% of fibrous material such as fiber glass is added to the composition and, when a suitable coloring of the insulators manufactured from said composition is desired, usually an amount of from about 0.3% to about 5% by weight of titanium dioxide is added.

The dielectric polymeric composition of this second embodiment of the invention may be regarded as a dielectric polymeric concrete and normally comprises an admixture of inorganic compounds which includes from about 40 to about 50% by weight of silica sand with a particle size such that no less than about 70% by weight of the particles are retained on a 60 mesh U.S. standard sieve and no more than about 30% by weight of the particles are retained on a 40 mesh U.S. standard sieve; from about 25 to about 35% by weight of silica sand with a particle size such that no less than about 80% by weight of the particles are retained on a 325 mesh U.S. standard sieve and no more than about 11% by weight of the particles are retained on a 200 mesh U.S. standard sieve; from about 3 to about 8% by weight of finely comminuted trihydrated alumina, preferably of the Hydral 710 type; and from about 1.5 to about 3% by weight of a fibrous material such as fiber glass, to constitute the filler for said polymeric concrete, and to which filler a mixture of organic ingredients is added, said organic ingredients comprising a mixture of from about 10 to about 24% by weight of an ortho- or iso-phthalic unsaturated polyester resin; from about 0.1 to about 0.5% by weight of benzoyl peroxide; from about 0.1 to about 0.5% by weight of a silica bonding agent such as trimethoxysilane or methacryloxypropyl-trimethoxysilane; from about 0.01 to about 0.2% by weight of a silicone oil, from about 0.8 to about 1.5% by weight of zinc stearate, from about 0.009 to about 0.1% by weight of a phenolic type antioxidant such as terbutylhydroxytoluene; and from about 0.3 to about 5% by weight of titanium dioxide.

The above described composition may be prepared by separately admixing the organic ingredients on the one hand and the inorganic ingredient on the other hand as follows: the organic compounds are introduced in a mixer at room temperature, that is, at a temperature of from about 20° about 30° C., in the following order: the first organic product introduced in the mixer is the stearate, followed by the anti-oxidant and the silicone oil, to thereafter add the organosilane, the benzoyl peroxide and finally the polyester resin. The thus formed mixture is homogenized by using a toothed propeller type mixer rotating at a speed of from about 3000 to about 6000 rpm, and the admixing operation is carried out for a period of time of from about 3 to about 4 minutes. The inorganic ingredients, except for the fibrous material, are separately admixed under heating at a temperature of from about 55° to about 60° C. and said inorganic ingredients are homogenized in order to form a highly homogeneous mixture, for instance, in a sigma type helical blade mixer, with a speed of rotation of the blades of from about 37 to about 23 rpm. The temperature of the mixture of inorganic ingredients is controlled by means of an outer jacket attached to the receptacle, such that the temperature will not be reduced below about 55° C., and the homogenization of the mixture is carried out for a period of time of from about 2 to about 3 minutes.

After the homogenized mixtures of organic and inorganic ingredients are separately prepared as described above, the mixture of the organic ingredients is added to the mixture of the inorganic ingredients in the same mixer, with a continuous stirring action and at a temperature within the range mentioned above, the addition being effected within a period of time not longer than about 60 seconds, and the stirring operation being continued during about 10 minutes maintaining the mixing receptacle duly covered. After said stirring period of about 10 minutes, if desired, a previously heated fibrous material such as fiber glass is added at the same temperature, for a period of about 1 minute, in order to avoid agglomeration of the materials and in order to facilitate the dispersion of said fibrous material. After the addition of the fiber glass, the composition is stirred for 10 more minutes, and thereafter the thus obtained polymeric concrete composition is discharged and packed for future use in the manufacture of insulators.

The polymeric composition described above is highly useful for the manufacture of molded insulators, inasmuch as it shows a consistency very much like that of a high molecular weight polymer which may be handled as a viscous fluid to be compression or injection molded in order to form electrical insulators having excellent dielectric and mechanical characteristics which derive from the excellent penetration of the polymeric matrix into the voids of the filler, and the bonding of said polymeric matrix to each individual particle of the filler, regardless of the fact that it is possible in accordance with the present invention to use monomers or polymer precursors having viscosities of up to about 8,000 cps, preferably from about 500 to about 5,000 cps, and still more preferably from about 3,000 to about 4,000 cps, at room temperature, such as partially polymerized monomers to be incorporated to the filler, having viscosities which are much higher than the viscosities necessary for accomplishing the same purposes in accordance with the prior art compositions and methods.

Particularly, and although the reasons why this occurs are not well understood, it is to be noted that the inclusion of only two different grades of silica sand into the filler composition, permits the use of relatively highly viscous polymeric materials to be incorporated as a matrix around the particles of the filler, with an excellent penetration and bonding of the polymeric matrix around the particles of the filler, and without the need of using extremely low viscosity polymer precursors which must be usually monomers without any degree of polymerization, and which obviously lengthen the time of molding of the insulators from the prior art compositions, as compared to the short time and the low pressure required in accordance with the present invention.

Without any intention of being bound to a theoretical explanation, it is believed that the removal of the intermediate particle size sand and of the very fine particle size sand in the filler composition, which apparently was considered to be indispensable in accordance with the teachings of the prior art and particularly with the teachings of Perry (U.S. Pat. No. 4,210,774), improves the efficiency of the mixture of the two separate grades of particles of the sand in accordance with the present invention, to improve the penetration and the bonding of the polymer matrix around the particles of the filler. In this respect, it is believed that the very fine particles which were considered as indispensable in accordance with the teachings of the prior art tend to agglomerate and form clogs which reduce the effective surface area of the filler and which form obstacles against the passage of the polymer precursor to fill in a complete manner the voids between the particles, thus reducing the efficiency of the filler for this purpose. On the other hand, the intermediate size particles, by being bulky bodies, probably act as plugs between the voids left by the larger particles of filler, thus assisting in the formation of plugs, clogs and obstacles which hinder the penetration of the polymer precursor to embed or wet in a complete manner the particles of the filler.

The elimination of the prior art intermediate size particles and the very fine particles from the filler material, in accordance with the present invention, in summary, has proven to be extremely advantageous by permitting the formation of a more homogeneous mixture in which the polymer matrix completely embeds the particles of the filler and is bonded thereto as a true matrix without any agglomeration of particles, whereby both the insulating, dielectric and the mechanical properties shown by the insulators molded from the above described molding composition, are considerably improved over the polymeric composition of the prior art.

The preferred inorganic ingredients for use in the preparation of the composition in accordance with the present invention are a fine silica sand (identified as mesh No. 220; Code SSJ-208, supplied by Materias Primas Monterrey, S. A., of Monterry, Mexico) and a coarse silica sand (identified as mesh No. 50/60; Code SSJ-20, also supplied by Materias Primas Monterrey, S. A.), although it must be understood that any other type of silica sands may be used, provided that the coarse and the fine silica sands satisfy the above described particle size characteristics that are critical to the present invention. These two preferred silica sands for use in preparing the composition of the present invention are shown in columns 2 and 3 of Table I, which show the sieve analysis of both sands.

TABLE I (SIEVE ANALYSIS, % BY WEIGHT)

| RETAINED ON U.S. SIEVE No. | SILICA SAND (MESH 200 SSJ-208) | SILICA SAND (MESH 50/60 SSJ-20) |
|---|---|---|
| 24 | — | 0.24 |
| 30 | — | 8.30 |
| 40 | — | 21.62 |
| 50 | — | 26.56 |
| 60 | — | 16.11 |
| 80 | 0.60 | 11.53 |
| 120 | 1.10 | 7.34 |
| 150 | 3.70 | 4.82 |
| 200 | 6.00 | 2.73 |
| 325 | 67.60 | 0.64 |
| 400 | 21.00 | 0.11 |

From the above table, it may be seen that the preferred coarse silica sand used as one of the inert ingredients of the composition of the invention has a particle size distribution such that 72.3% by weight of the particles are retained on a 60 mesh sieve and only 30.16% of the particles are retained on a 40 mesh sieve. The percentage of retention of the particles of the preferred coarse sand on sieves having a mesh size of 150 and up, is practically negligible, which assures the absence of very fine particles in this type of sand.

It may also be seen than the preferred fine sand used for preparing the composition of the invention has a particle size distribution such that 79.0% of the particles are retained on a 325 mesh sieve and only 11.4% of the particles are retained on a 200 mesh sieve. The percentage of retention of the particles on sieves having a mesh size of 120 and down, is practically negligible, which assures the absence of very coarse particles in this type of sand.

Also, an inspection of the above table shows that in the middle size sieves (120 to 200 mesh), the percentage of reetention of the particles of both the fine and the coarse sands is relatively low, which means that there is a relatively low proportion of medium size particles.

All of the above secures that the inert ingredients of the composition of the invention be constituted by only two highly differentiated types of sands, one which is a relatively coarse sand and one other which is a relatively fine sand, with practical absence of medium size and very fine particles. These characteristics of the sands used in the present invention in turn secure that there will not be any noticeable possibility of formation of plugs caused by middle size particles and of clogs formed by the agglomeration of extremely fine particles, as discussed above.

Figure 2:
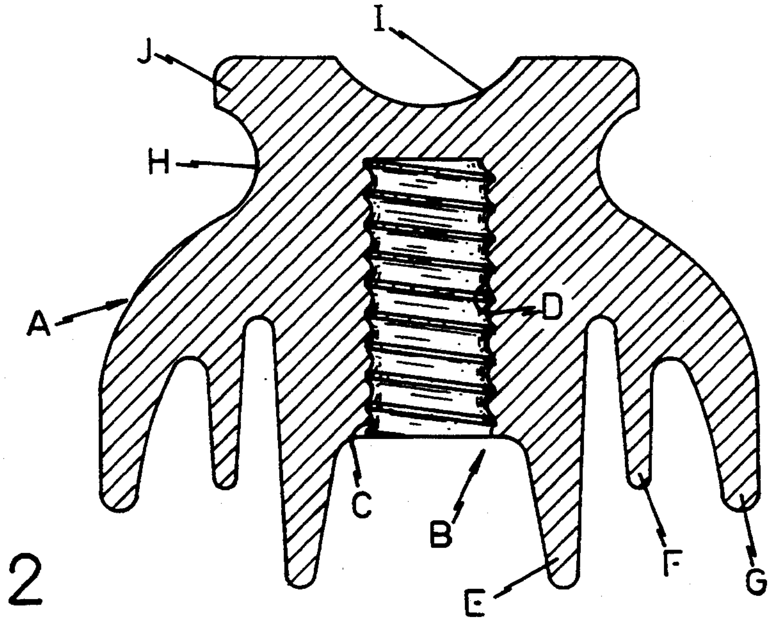
FIG. 2 is a cross sectional elevational view of the outdoor insulator shown in FIG. 1.

Having now more particular reference to the accompanying drawings, FIGS. 1 and 2 thereof show a typical pin type insulator suitable for outdoor use, manufactured from the molding composition not containing fiber material, in order to improve the tracking resistance characteristics of the insulator in outdoor use, that is, when the insulator is subjected to very harsh environmental conditions. Although the insulators may adopt any desirable shape, in a preferred embodiment of the present invention, the insulator for outdoor use as seen in FIG. 1 shows a body A which at its lower portion presents an edge G and a downwardly extending central projection E; at its upper end it presents a neck H and a widened upper or top portion J in which a cross channel I is included, as is customary in connection with this type of insulators very well known in the prior art.

FIG. 2 of the drawings shows the same insulator shown in FIG. 1, wherein it may be seen that at the lower portion thereof there are a multiplicity of projections E and F of an approximately cylindrical shape, in order to avoid, as is also very well known in the art, the spreading of water towards the center of the insulator, designated by the reference character B and in which a bore C is provided containing a suitable thread B to receive a metallic bolt to be attached to a pole or similar supporting device.

Figure 3:
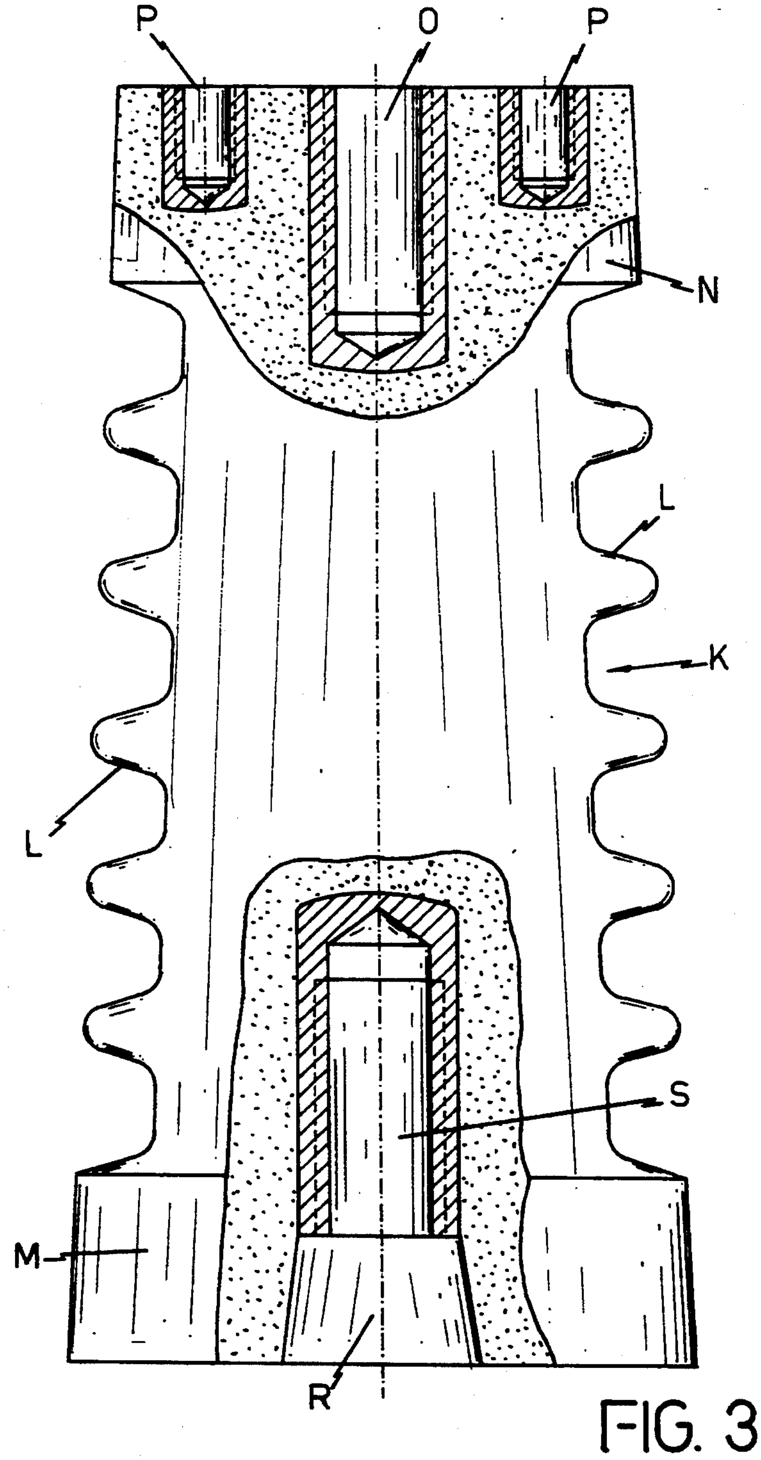
FIG. 3 is an elevational view of an insulator for indoor use, manufactured in accordance with another embodiment of the present invention.
Figure 4:
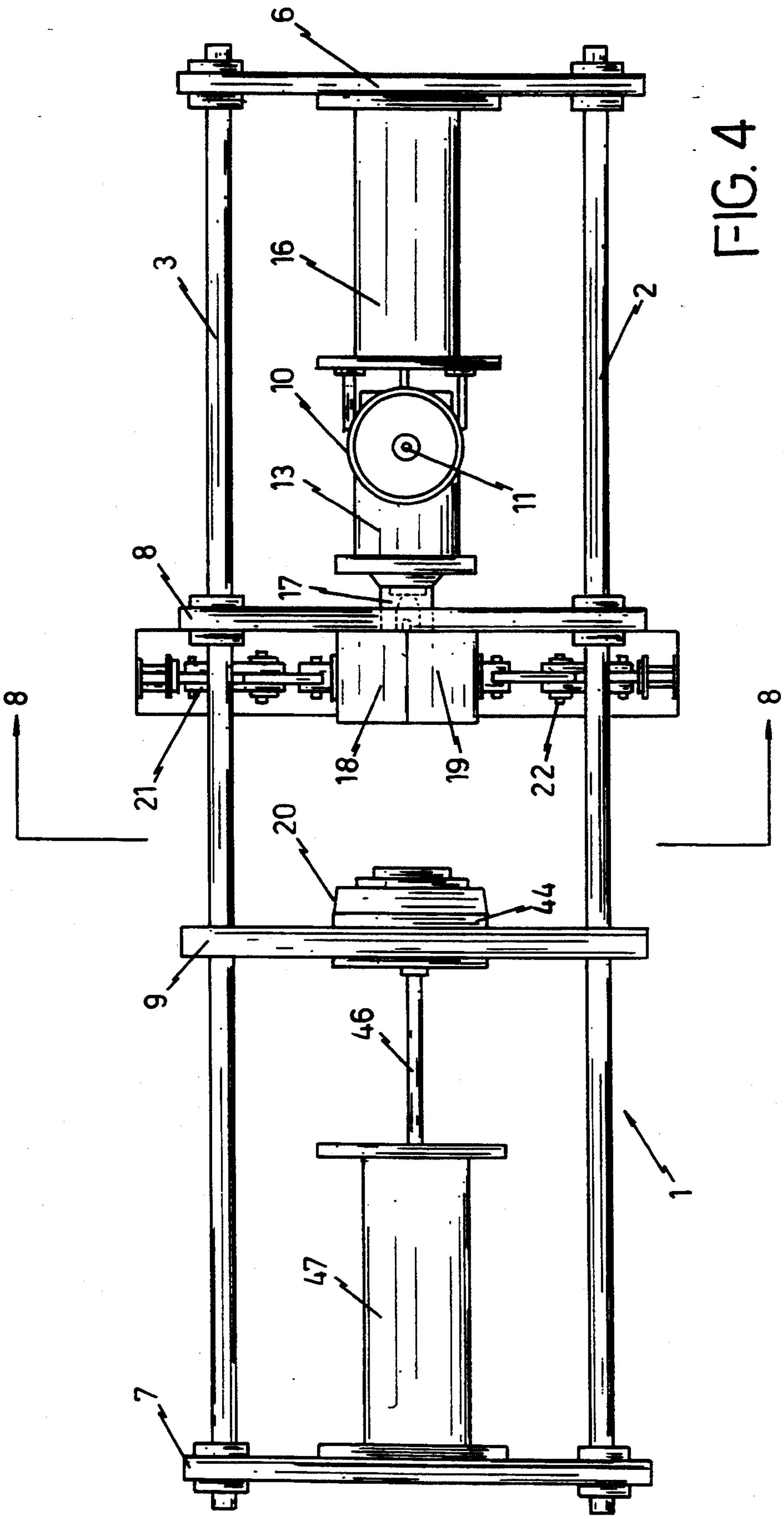
FIG. 4 is a plan view of a highly simplified injection molding machine for the manufacture of insulators, built in accordance with a preferred embodiment of the present invention.
Figure 5:
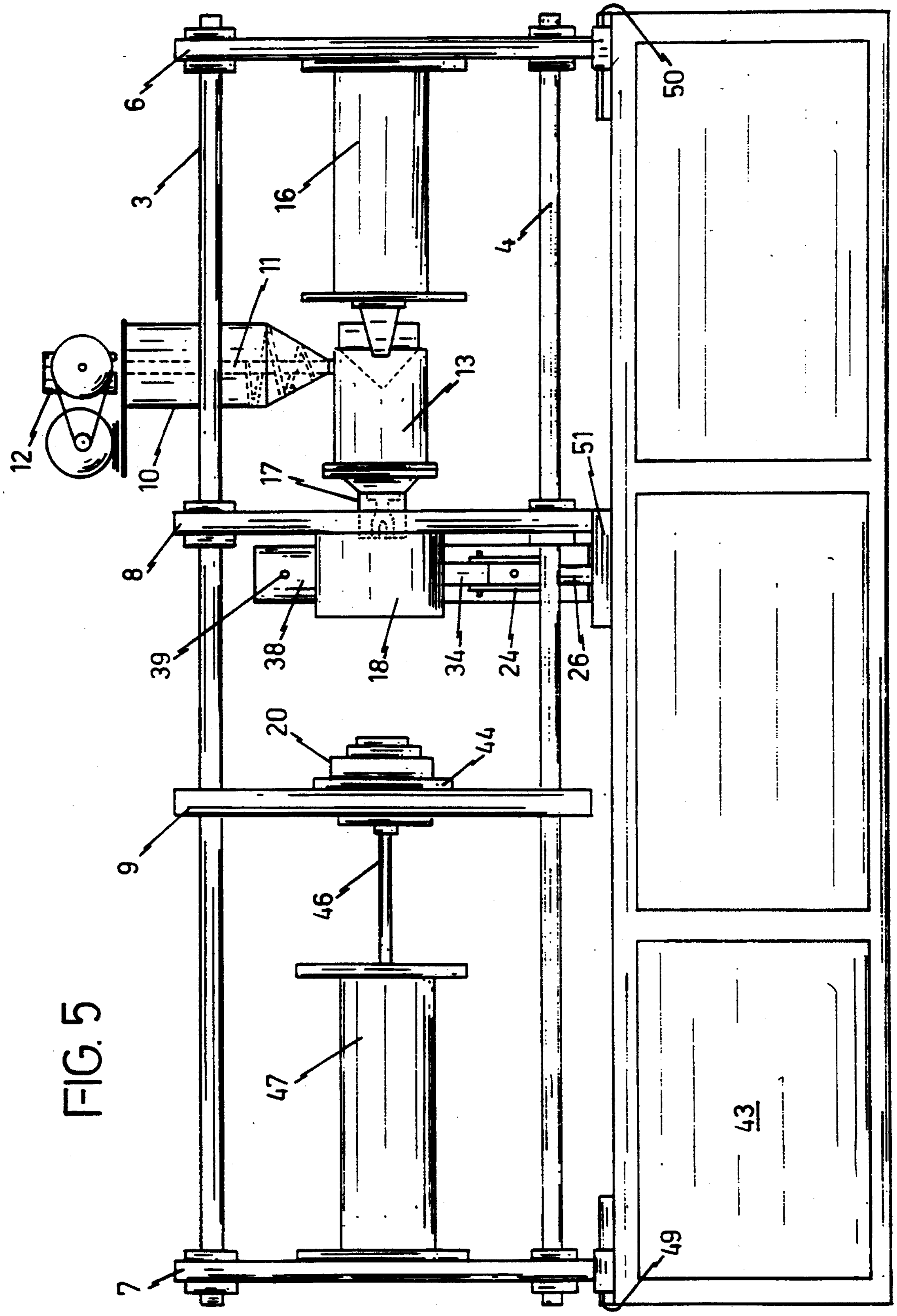
FIG. 5 is an elevational view of a highly simplified injection molding machine for the manufacture of insulator.
Figure 6:
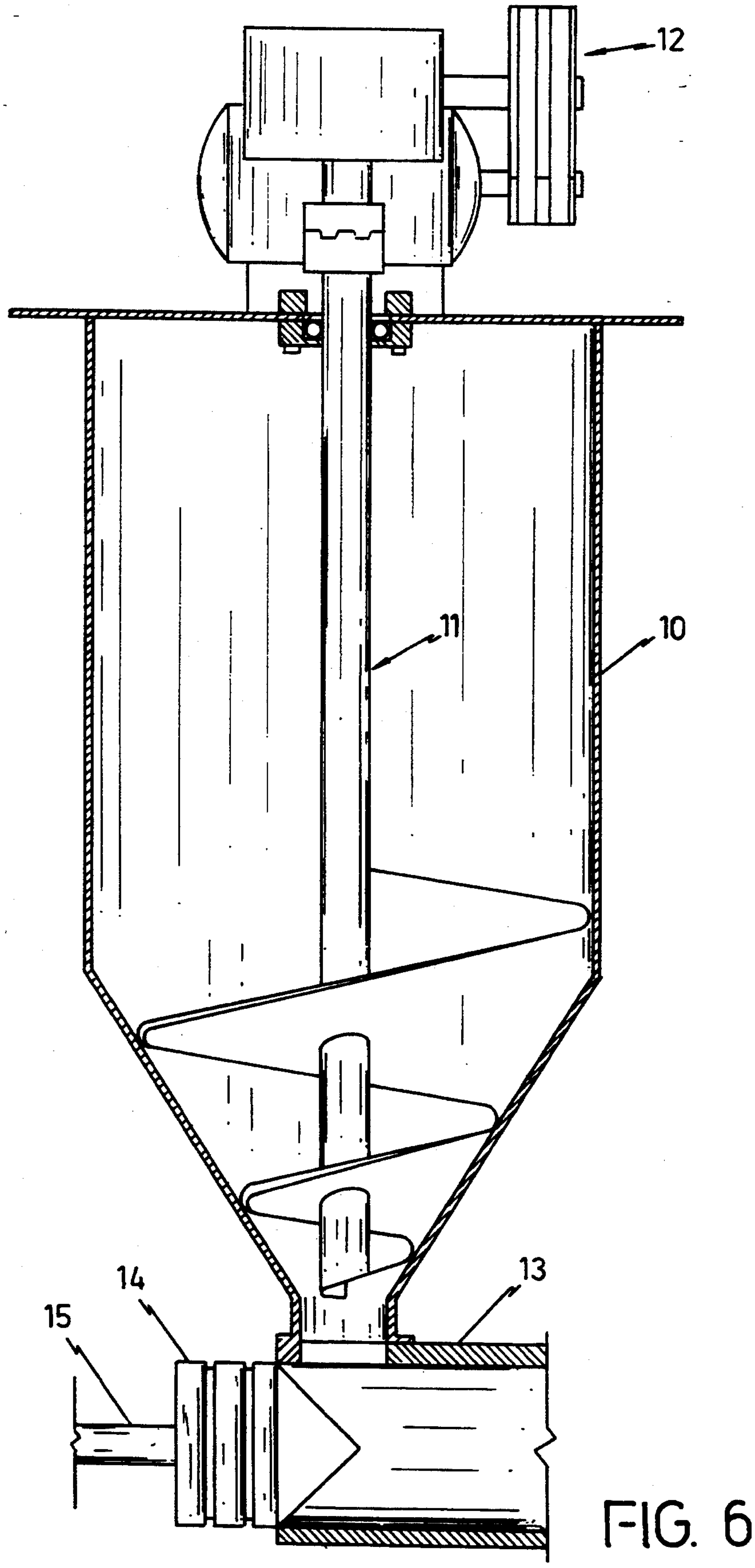
FIG. 6 is a cross sectional elevational view of a simplified feeder for the polymeric composition to the machine shown in FIGS. 4 and 5.
Figure 7:
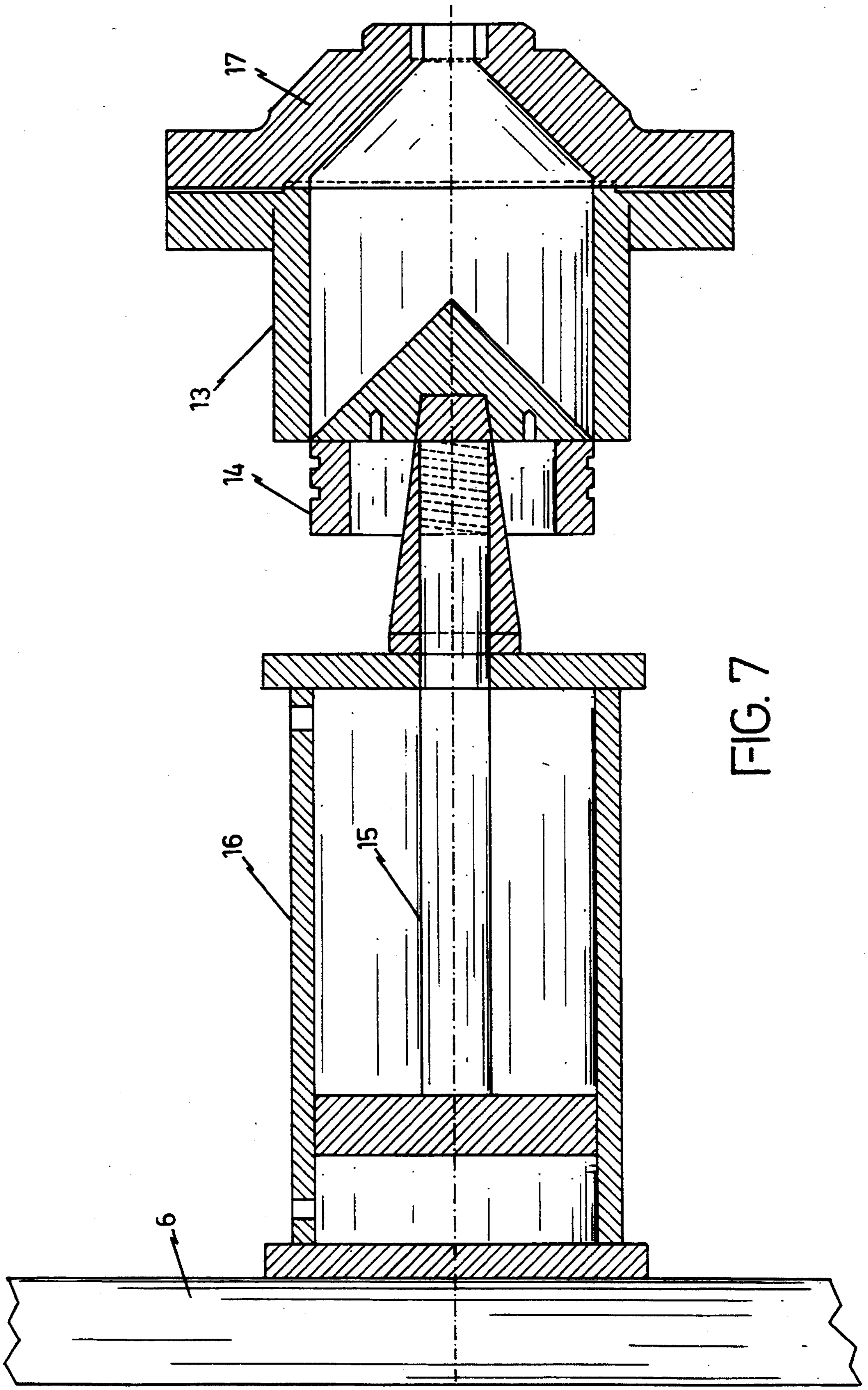
FIG. 7 is a cross sectional view of the injection chamber and piston of the machine built in accordance with the present invention.

FIG. 3, on the other hand, shows an electrical insulator suitable for indoor use, and preferably manufactured with the composition of the present invention which also contains fibrous material, particularly fiber glass, and which comprises a body K of a frustoconical elongated shape, provided with a plurality of circular flanges L, said body K being provided with widened cylindrical portions M and N at the lower and upper ends thereof respectively. At the lower end of the insulator, a bore S is provided for the insertion of a suitable support for attachment to an electrical fitting, preferably with a flaring mouth R opening towards the lower end of the insulator. The upper widened portion N comprises, as is also well known in the art, a plurality of bores such as O and P, wherein suitable electrical elements are supported, such as conductor wires and the like by means of suitable brackets inserted into each one of the bores O and P.

Although the polymeric compositions in accordance with the present invention may be molded by the traditionally used compression method, in view of the possibility of molding such compositions to form the insulators in a very fast manner, it is preferred to injection mold the composition of the present invention so as to form said insulators, inasmuch as by treatment of the composition at a predetermined pressure and temperature which are both low as compared to prior art methods of molding insulators, the time of completion of the molding operation may be as short as from 5 to 10 minutes, which is highly appropriate for the injection molding of said insulators.

More particularly, the molding of the composition in accordance with the present invention may be carried out by pre-heating the composition to a temperature of from about 25° to about 60° C., injecting the same into a suitable mold and maintaining the mold at a temperature of from about 110° to about 130° C., to thereafter apply a pressure of from about 56 to about 145 Kg. per square cm., for a period of time of from about 5 to 10 minutes, in order to produce a finished injection molded insulator.

In order to provide a highly simplified injection molding machine for carrying out the method described above, which is capable of molding complete insulators in times as short as 5 or 6 minutes, it is preferred to use an injection molding machine as shown in FIGS. 4 to 9 of the drawings, in which an extremely simplified, small and easy to operate injection molding machine is shown, which essentially comprises a support frame 1 formed by a plurality of bars such as 2, 3, 4 and 5, attached to a pair of end plates 6 and 7, and supporting an intermediate fixed plate 8.

The support frame 1 mentioned above, is placed and attached on top of a table 43, by means of suitable connecting plates 49, 50 and 51, located at the ends and at the center of the frame 1, respectively.

A feeding hopper for the molding material, designated generally by means of reference numeral 10, is supported by said frame 1, and comprises a vertical screw conveyor 11 operated by means of a motor/speed reduction gear 12, which feeds the molding material to an injection chamber 13, into which a piston 14 is moved by means of a pneumatic or hydraulic motor 16 connected to said piston 14 by means of a rod 15. The hydraulic or pneumatic motor 16 is supported on plate 6 fixed at one end of the bars. An injection nozzle 17 is arranged at the end of the injection chamber 13 opposite to piston 14, suitable to inject the paste-like molding material into a split mold formed by two mold halves 18 and 19, which are opened or closed towards each other sidewardly of the machine direction, by means of a respective pair of pivotal toggle mechanisms 21 and 22, operated by means of links 23 and 24 in turn operated by pneumatic or hydraulic motors 27 and 28, through respective piston rods 25 and 26, as more clearly shown in FIG. 8 of the drawings.

Figure 8:
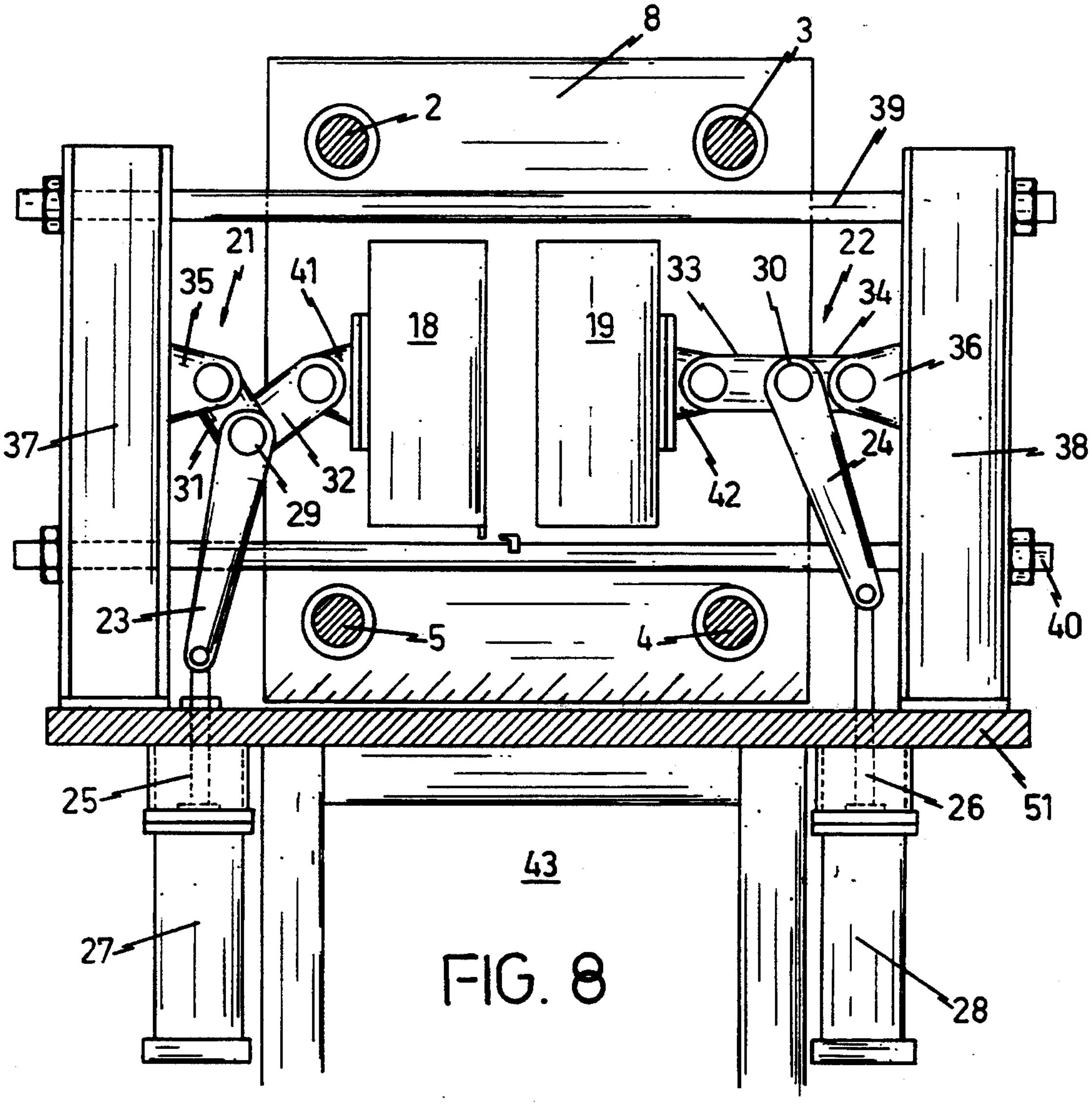
FIG. 8 is an elevational view of the mechanism for closing the split mold of the machine built in accordance with the present invention.
Figure 9:
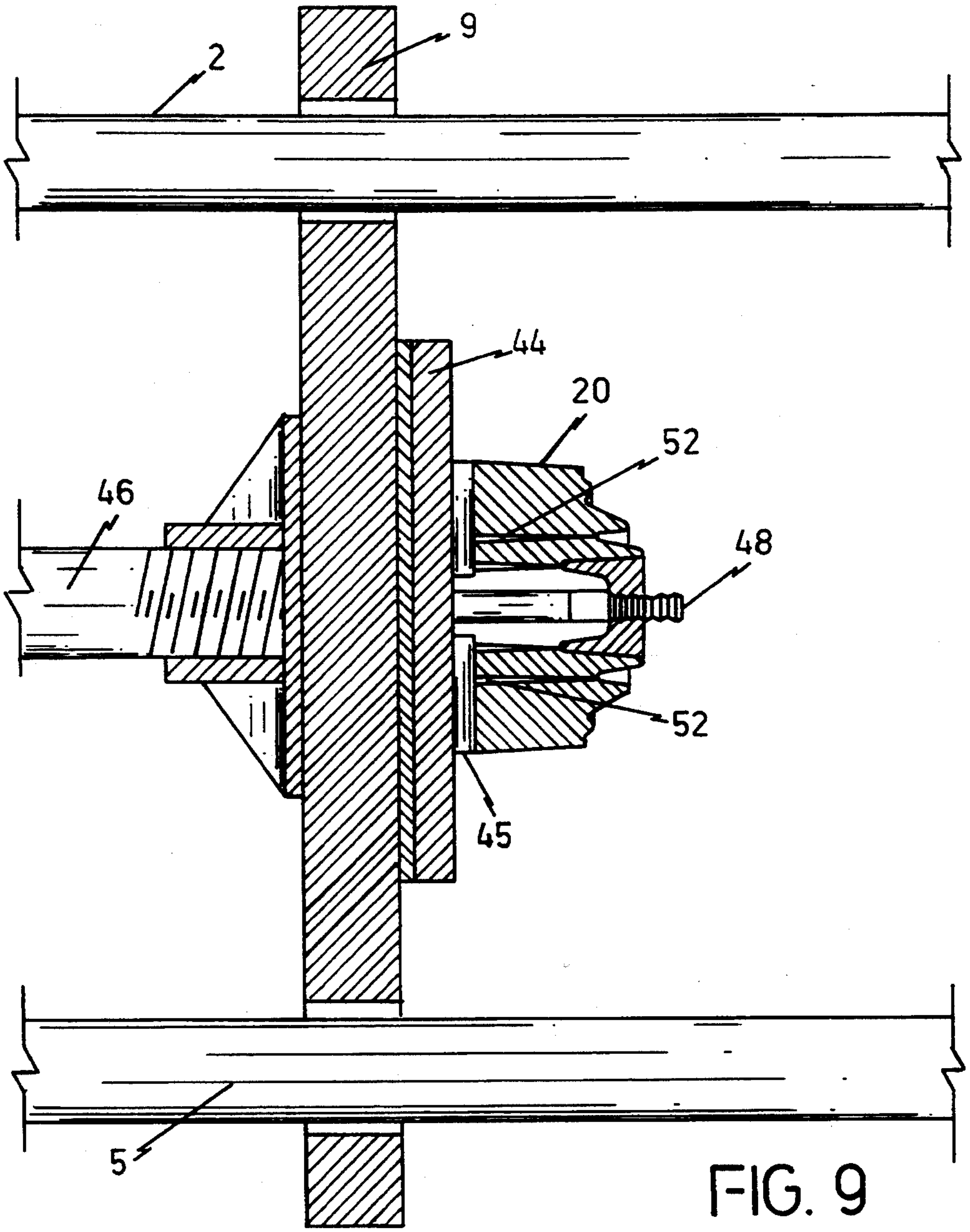
FIG. 9 is a cross sectional view of the reciprocable mold and core built in accordance with the preferred embodiment of the present invention.

One end of the toggles 31, 32 and 33, 34 is supported by means of respective lugs 35, 36, to respective vertical poles 37, 38 fixed in position by means of crosswise rods 39 and 40 and attached to the central connecting plate 51. The other end of the toggles 31, 32 and 33, 34 is attached by means of respective lugs 41 and 42, to a pair of respective mold halves 18 and 19 of a split mold which partially form a molding cavity having one of its ends open to receive a complementary molding head 20 as will be described in more detail hereinbelow. The toggles are extended or retracted by the pivotal connection of their arms 31, 32 or 33, 34 through a common pin 29, 30, with the respective links 23 and 24 as shown in FIG. 8 in order to close or open the mold halves 18 and 19 to form the molding cavity. The above described assembly is mounted on the fixed plate 8 and forms the female portion of the mold.

The male portion of the mold which completes and closes the molding cavity, is actuated by means of a pneumatic or hydraulic motor 47 supported on fixed end plate 7, by means of a piston rod which actuates on the movable plate 9 which supports a molding head 20 provided with the complementary shape to the mold halves 18 and 19 to produce an article of the desired shape, and a heating plate 44 is mounted on said movable or slidable plate 9, in order to raise and maintain the temperature of the mold cavity at the desired value.

At the bottom of the molding head 20, a plurality of radially outwardly directed bores 45 are provided and a plurality of axially directed narrow channels 52 are connected between said bores 45 and the interior of the molding cavity, for the purpose of permitting the outward flow of air when the mold cavity constituted by the split halves 18 and 19 and the molding head 20 is filled with the molding composition.

In order to permit the passage of air and at the same time prevent the passage of any molding composition into the channels 52, said channels have a frustoconical shape with its smaller end opening towards the mold cavity and its wider end opening towards said bores 45 to exhaust the air to the atmosphere.

When a central threaded bore (C in FIG. 2) is desired in a needle type insulator as that illustrated in FIGS. 1 and 2, the mold head 20 is provided with an outwardly threaded core 48 extending from the center of said molding head, said core 48 being interchangeable and being discarded after each molding operation.

The molding operation is carried out by firstly closing the mold halves 18 and 19, by actuating the motors 27 and 28 in the direction which extends the toggles 31, 32 and 33, 34, then actuating the motor 47 to extend the piston rod 46 which pushes the sliding plate 9, in order to introduce the molding head 20 or male portion of the mold into the open end of the cavity formed by the closed mold halves 18 and 19, to thereafter proceed to the injection of the molding material by means of the above described injection chamber 13 and piston 14. The heater 44 is of course energized to maintain the temperature of the mold cavity within desired limits. After a predetermined period of time of about 6 to 7 minutes for a 5 kg. load of polymeric material under a predetermined pressure and temperature, the above operations are reversed and the molded insulator is removed from the machine.

It will be apparent to any one skilled in the art that the above described injection molding machine may be used to mold insulators of any desired shape, by the mere expedient of changing the shape of the mold cavity formed by the mold halves 18 and 19 and the molding head 20, and by also changing the shape and arrangement of the core 48 or placing any desired number of cores on the molding head 20, without thereby departing from the intended scope of this application.

The present invention will be more clearly understood by having reference to the following examples, which are given only for illustrative but non-limitative purposes.

EXAMPLE 1

A highly filled polymeric composition was prepared by following the formulation procedure described above and using the inorganic and organic ingredients shown in the column marked "Sample No. 1" in Table II below. The thus obtained composition was molded by the compression method in order to produce a test specimen in accordance with the ASTM standards. Finally, the thus obtained specimen was tested in order to determine its properties, and the results of said tests are shown in the column marked "Sample No. 1" in Table III below.

EXAMPLE 2

A highly filed polymeric composition was prepared by following the formulation procedure described above and using the inorganic and organic ingredients shown in the column marked "Sample No. 2" in Table II below. The thus obtained composition was molded by the injection method in order to produce a test specimen in accordance with the ASTM standards. Finally, the thus obtained specimen was tested in order to determine its properties, and the results of said tests are shown in the column marked "Sample No. 2" in Table III below.

TABLE II

| | SAMPLE No. 1 | SAMPLE No. 2 |
|---|---|---|
| INORGANIC COMPONENTS | | |
| Silica Sand SSJ-20 (mesh 50/60) (Materias Primas Monterrey, S. A.) | 46 | 47.22 |
| Silica Sand SSJ-208 (mesh 200) (Materias Primas Monterrey, S. A.) | 31 | 31.48 |
| Trihydrated Alumina Hydral 710 (Aluminum Corp. of America) | 6 | 6.01 |
| TOTALS INORGANICS: | 83 | 84.71 |
| ORGANIC COMPONENTS | | |
| Styrene Monomer | 6 | — |
| Accelerator (Cobalt Naphtenate) | 0.055 | — |
| Catalyst (MEKP) | 0.11 | — |
| Silane (A-174) | 0.71 | 0.76 |
| Inhibitor | — | 0.02 |
| Polyester Premix Orthophthalic unsaturated polyester resin (8016) | 10 | 13.33 |
| Benzoyl Peroxide | — | 0.04 |
| Calcium Stearate | — | 1.0 |
| Silicone Oil | — | 0.13 |
| TOTALS ORGANICS: | 16.87 | 15.28 |

The properties of the specimens obtained in accordance with Examples 1 and 2, as mentioned above, are indicated in Table III below. For comparative purposes, in the column marked "Prior Art Sample" in Table III, the corresponding properties of a specimen obtained in accordance with Perry, U.S. Pat. No. 4,210,774, are included.

TABLE III

| PROPERTIES | PRIOR ART SAMPLE | SAMPLE No. 1 | SAMPLE No. 2. |
|---|---|---|---|
| PHYSICAL | | | |
| Shrinkage, % | 0.83 | 0.62 | 0.47 |
| Expansion Coeff., $\times 10^{-6}/°C.$ (ASTM E-831) | 32.7 | 33.0 | 33.2 |
| MECHANICAL | | | |
| Split Tensile Stress, psi (ASTM D-638) | 2,400 | 2,402 | 5,002 |
| Flexural Strength, psi (ASTM D-790) | 8,400 | 7,702 | 9,891 |
| Compressive Strength, psi (ASTM D-695) | 19,000 | 19,695 | 22,254 |
| ELECTRICAL | | | |
| Permitivity (ASTM D-150) | 4.5 | — | 4.2 |
| Dissipation Factor, % (ASTM D-150) | 1.57 | — | 1.52 |
| Volume Resistance, ohm cm (ASTM D-257) | $7 \times E^{11}$ | $3 \times E^{11}$ | $2.34 \times E^{15}$ |
| Surface Resist., ohm/cm$^2$ | $1 \times E^{10}$ | $1.5 \times E^{13}$ | $9.34 \times E^{15}$ |
| Dielectric Strength, V/mil (ASTM D-149) | 250 | 508 | 635 |
| Inclined Plane Tracking Resistance., hr. (ASTM D-2303) | 5 @ 2.5 KV | 15 @ 6 KV* | 100 @ 6 KV |

TABLE III-continued

| PROPERTIES | PRIOR ART SAMPLE | SAMPLE No. 1 | SAMPLE No. 2. |
|---|---|---|---|
| Ontario Hydro Tracking Wheel, hr. | 787 | 2071 | 3242 |

*With Post-cure (60 min. at 120° C.) the value increases to 56.4 hr.

A comparative analysis of the properties experimentally determined by the standard ASTM methods indicated in the first column of Table III, very clearly shows that the physical properties and the mechanical properties of Sample No. 2 are generally better than the equivalent properties of Sample No. 1 and much better than those in the Prior Art Sample.

However, considering the electrical properties of the three samples, it may be seen that the electrical properties of Sample No. 2 which strictly corresponds to the present invention, are superior in various orders of magnitude to the corresponding electrical properties of the Prior Art Sample which corresponds to Perry U.S. Pat. No. 4,210,774 and that the electrical properties of Sample No. 1 which is a modified composition obtained by using the same organic ingredients of the composition of Perry (U.S. Pat. No. 4,210,774) but with the inorganic components of the composition of the present invention, are also much better, occasionally in various orders of magnitude, than the properties of the prior art composition.

More particularly, from Table III above, it may be seen that the shrinkage is lower in Sample No. 2 than in Sample No. 1, and that the latter is in turn lower than the shrinkage in the Prior Art Sample. The expansion coefficient is approximately equivalent in the three samples.

Therefore, it may be concluded from these results, that the physical properties of the composition in accordance with the present invention are slightly better than those of the prior art composition, since even when the expansion coefficient is approximately the same in the three samples, the shrinkage is much better in Sample No. 2 which corresponds to the present invention, than in the Prior Art Sample which corresponds to U.S. Pat. No. 4,210,774.

In connection with the mechanical properties, it may be seen that the split tensile strength is approximately the same in the Prior Art Sample and in Sample No. 1, but is more than twice larger in Sample No. 2.

The flexural strength is higher in the Prior Art Sample than in Sample No. 1, but the said flexural strength for Sample No. 2 is still higher than that in the Prior Art Sample.

The compressive strength is approximately the same in the Prior Art Sample and in Sample No. 1, but is much higher in Sample No. 2.

Therefore, all the mechanical properties of Sample No. 2 corresponding to the instant invention are far better than those of the Prior Art Sample corresponding to U.S. Pat. No. 4,210,774.

The main differences, however, as stated above, reside on the electrical properties and thus, although the permitivity and the dissipation factor are approximately the same in the Prior Art Sample and Sample No. 2 (no determinations were made for Sample No. 1), the volume resistance in Sample No. 2 is higher in four orders of magnitude than that of the Prior Art Sample and Sample No. 1.

The surface resistance, which is one of the main properties that determine the tracking resistance of electrical insulators manufactured from compositions like those under consideration, is higher by five orders of magnitude in Sample No. 2 than in the Prior Art Sample, and in turn the surface resistance in Sample No. 1 is higher by three orders of magnitude than that in the Prior Art Sample. This characteristic of the insulators manufactured with compositions Nos. 1 and 2, very clearly point to the fact that the tracking resistance of the compositions containing the inert or inorganic ingredients in accordance with the present invention, regardless of the specific type of organic ingredients incorporated therein, are far better than the electrical insulators manufactured with the prior art composition of Perry, U.S. Pat. No. 4,210,774 inserted for comparative purposes in Table III above.

The dielectric strength of Sample No. 1 is twice as much than that of the Prior Art Sample, whereas the corresponding dielectric strength of Sample No. 2 is three times larger than that in the Prior Art Sample.

The tracking resistance, as determined by the inclined plane method ASTM D-2303, is three times larger in Sample No. 1 as compared to the Prior Art Sample, at a higher voltage, and is 20 times higher at the same higher voltage in Sample No. 2 as compared to the Prior Art Sample.

Finally, the tracking resistance as determined by the Ontario hydro wheel method, is also far better in Sample No. 2 than in Sample No. 1 and the latter is far better than that in the Prior Art Sample.

From the above comparative analysis of the three samples, it may be concluded that the physical and mechanical properties of the insulators manufactured in accordance with the present invention, are generally better than the corresponding physical and mechanical properties of the insulators manufactured in accordance with the prior art, including those of U.S. Pat. No. 4,210,774. The main difference resides on the electrical properties, which are better by several objects of magnitude, particularly the surface resistance and the tracking resistance, in the insulators manufactured in accordance with the present invention, as compared to the insulators manufactured in accordance with the prior art included here for reference.

As it has been shown in the above examples, a decrease in the concentration of inorganic components and the consequent increase in the concentration of organic components in a moldable polymeric composition for electrical insulators, together with the use of organic components of higher viscosity and of a mixture of inorganic components that provides a more adequate distribution of hollow spaces for the dissemination of the organic components to encapsulate the same, accomplishes quite unexpected results, namely, far better electrical properties and much better physical and mechanical properties in the insulators manufactured with the compositions in accordance with the present invention, as compared to the electrical insulators manufactured with the polymeric compositions of the prior art.

Although certain specific embodiments of the present invention have been shown and described above, it is to be understood that many modifications thereof are possible. The invention, therefore, is not to be restricted except insofar as is necessitated by the prior art and by the spirit of the appended claims.

What is claimed is:

1. A tracking resistant electrical insulator consisting of a molded body comprising (1) an unsaturated phthalate polyester resin matrix comprising the reaction product of an unsaturated phthalate polyester precursor having a viscosity higher than about 500 cps at room temperature and (2) from about 76 to about 96 percent by weight, based on the total weight of the insulator, of a filler composition comprising:

a) silica having a particle size distribution such that no less than about 70% by weight of the particles are retained on a 60 mesh U.S. standard sieve and no more than about 30% by weight of the particles are retained on a 40 mesh U.S. standard sieve, in an amount of from about 40 to about 52 percent by weight based on the total weight of the insulator;

b) silica having a particle size distribution such that no less than about 80% by weight of the particles are retained on a 325 mesh U.S. standard sieve and no more than about 11% by weight of the particles are retained on a 200 mesh U.S. standard sieve, in an amount of from about 23 to 36 percent by weight based on the total weight of the insulator; and c) from about 3 to about 8 percent by weight of alumina particles based on the total weight of the insulator.

2. An electrical insulator according to claim 1 wherein said unsaturated phthalate polyester resin is formed from an unsaturated phthalate polyester precursor having a viscosity of from about 3,000 to about 4,000 cps at room temperature.

3. An electrical insulator according to claim 1 wherein the filter also includes an amount of from about 1.5 to about 3% by weight of the total weight of the insulator of a fibrous inorganic material.

4. An electrical insulator according to claim 3 wherein said fibrous inorganic material is fiber glass.

5. An electrical insulator according to claim 1 wherein the filler particles are bonded to said resin matrix by an amount of from about 0.05 to about 0.5% by weight of the total weight of the insulator of an organosilane bonding agent.

6. An electrical insulator according to claim 1 wherein the filler particles are bonded to said resin matrix by an amount of from about 0.05 to about 0.5% by weight of the total weight of the insulator of a methacryloxypropyl-trimethoxysilane bonding agent.

7. A highly filled polymerizable composition for the manufacture of electrical insulators, comprising an admixture of from about 40 to about 52% by weight of silica sand having a particle size such that no less than about 70% by weight of the particles are retained on a 60 mesh U.S. standard sieve and no more than about 30% by weight of the particles are retained on a 40 mesh U.S. standard sieve; an amount of from about 23 to about 36% by weight of silica sand having a particle size such that no less than about 80% by weight of the particles are retained on a 325 mesh U.S. standard sieve and no more than about 11% by weight of the particles are retained on a 200 mesh U.S. standard sieve; from about 3 to about 8% by weight of alumina particles; from about 4 to about 24% by weight of an ortho- or iso-phthalic unsaturated polyester precursor having a viscosity of from about 500 to about 8,000 cps at room temperature; from about 0.1 to about 0.7% by weight of benzoyl peroxide curing agent; from about 0.05 to about 0.5% by weight of an organosilane bonding agent; from about 0.01 to about 0.2% by weight of a silicone oil lubricant; from about 0.5 to about 1.5% by weight of a stearate plasticizer; and from about 0.01 to about 0.1% by weight of a phenolic antioxidant.

8. A highly filled polymerizable composition according to claim 7 also including from about 1.5 to about 3.0% by weight of fiber glass.

9. A method of preparing a molding composition for the manufacture of electrical insulators, said composition including a filler material comprising, based on the total weight of the composition, from about 40 to about 52% by weight of silica sand having a particle size such that no less than about 70% by weight of the particles are retained on a 60 mesh U.S. standard sieve and no more than about 30% by weight of the particles are retained on a 40 mesh U.S. standard sieve; an amount of from about 23 to about 36% by weight of silica sand having a particle size such that no less than about 80% by weight of the particles are retained on a 325 mesh U.S. standard sieve and no more than about 11% by weight of the particles are retained on a 200 mesh U.S. standard sieve; and from about 3 to about 8% by weight of alumina particles; and a polymerizable matrix material comprising, based on the total weight of the composition, from about 4 to about 24% by weight of an ortho- or isophthalic unsaturated polyester precursor, from about 0.1 to about 0.7% by weight of benzoyl peroxide curing agent, from about 0.05 to about 0.5% by weight of an organosilane bonding agent, from about 0.01 to about 0.2% by weight of a silicone oil lubricant, from about 0.5 to about 1.5% by weight of a stearate plasticizer, and from about 0.01 to about 0.1% by weight of a phenolic antioxidant, said method comprising the steps of admixing the organic ingredients at a temperature of from about 20° to about 30° C. by adding said ingredients in the following order: the stearate, the anti-oxidant and the silicone oil, then the organosilane and the benzoyl peroxide, and finally the unsaturated polyester resin precursor, and homogenizing the mixture by blending same for a period of time of from about 3 to about 4 minutes; separately admixing the inorganic ingredients under heating at a temperature of from about 55° to about 60° C. and homogenizing same; and pouring the mixture of the organic ingredients on the mixture of the inorganic ingredients with continuous stirring for about 10 minutes and under a temperature of from about 55° to about 65° C.

10. A method according to claim 9 wherein an amount of from about 1.5 to about 3% by weight of fiber glass is added to the final mixture and the stirring is continued for an additional period of time of about 10 minutes at a temperature of from about 55° to about 65° C.

* * * * *